2,768,893

BRAZING ALLOYS

Nikolajs Bredzs, Chicago, Ill., assignor, by mesne assignments, to Lithium Corporation of America, Inc., Minneapolis, Minn., a corporation of Minnesota No Drawing. Application July 25, 1955,
Serial No. 524,301

9 Claims. (Cl. 75—159)

My invention relates to improvements in the brazing of metals and is especially concerned with the production of new and useful self-fluxing, air-proof brazing alloys and to the use of such alloys in the brazing of metals, particularly steels.

In the brazing of metals, it is essential, for effective results, that the brazing metal, which, at the temperature at which the brazing operation is conducted, commonly in the range of about 700 to 1000 degrees C., is in a liquid or molten state, wet the surface of the solid metal which is to be brazed with the brazing metal. The presence of metal oxides at the interface between the solid metal to be brazed and the molten brazing metal prevents the desired wetting action. When the brazing operation is carried out in a reducing atmosphere, various of the oxides which would normally form at the elevated temperatures involved are prevented from forming and any which do form, other than those of particularly stable character, are promptly reduced. Hence, as is well known, dry reducing or inert atmospheres tend to maintain the conditions conductive to wetting and generally bring about desirable brazing results.

In many brazing operations, however, the procedure including the heating step, from a practical standpoint, must be carried out in air or in the open atmosphere and, hence, it is common practice to utilize fluxes to remove the metal oxides which inevitably form, the fluxes functioning essentially as oxide removers and oxygen barriers. Conventional brazing fluxes comprise mixtures of salts which are solid at normal temperatures and which must be melted in contact with the work or solid metal to be brazed before they are effective to bring about their intended removal of metal oxides. In other words, for best results, the flux used must be molten and active before the brazing metal bonds to the work. A satisfactory flux must also be of such character as to form a continuous, unbroken film over the joint area; even when loaded with dissolved and suspended oxides it must have a viscosity sufficiently low to assure its physical displacement by the molten brazing metal from the narrow capillary gaps of the joint; it should be easily removable from the brazed work and, if not completely removed or removable, the residue should not be of such character as to cause eventual corrosion as, for instance, by hydrolysis. It is also known that the lower the temperature at which the brazing operation can be conducted the less will be the amount of oxidation of the work before said brazing operation is completed. Since flux mixtures of very low melting point are relatively unstable at higher temperatures, some compromise is necessary. For practical purposes, a flux should be molten and active at a temperature about 90 degrees F. below the temperature at which the brazing metal starts to melt and, in addition, the flux should be stable up to the maximum temperature required during the brazing operation. So far as I am aware, none of the brazing fluxes which are in use or which have been suggested for use fully satisfies the aforementioned requirements.

In an effort to meet the problems in brazing and to eliminate the necessity for the use of either reducing atmospheres or the use of fluxes, the employment of certain self-fluxing brazing alloys has been proposed, such alloys containing constituents capable of reducing the metal oxides normally formed in the brazing operation. In this connection, it has heretofore been known to produce self-fluxing silver base alloys containing a small percentage of lithium, generally about 1% to about 2%. Such self-fluxing alloys can be used with reasonably good results if the brazing operation is carried out in an inert atmosphere as, for example, helium or nitrogen, or in an oxyacetylene torch brazing atmosphere, for the brazing of such metals as plain carbon steels, alloy steels, stainless steels, and various other metals; or, in the case of titanium, a helium atmosphere. Such silver-base self-fluxing brazing alloys possess the marked disadvantage, however, of requiring special atmospheres, such as dry inert atmospheres, in which the brazing operation is to be carried out. Even very small proportions of oxygen or moisture in the inert atmosphere causes oxidation of the lithium and the joints brazed by such alloys become contaminated by lithium oxide.

I have discovered that the addition of minor proportions of both boron and lithium to copper-nickel alloys results in the production of self-fluxing "air-proof" brazing alloys. Such alloys can be utilized with considerable effectiveness, without the necessity of using fluxes or carrying out the brazing operation in reducing atmospheres or inert atmospheres, for brazing various metals but are especially effective for brazing steels including plain carbon steels and alloy steels such as stainless steels. In a typical or illustrative instance, low carbon (SAE 1020) steel bars were brazed in air by the use of brazing alloys of my present invention. Extremely strong joints were obtained which, when subjected to a quite severe water quench from the brazing temperature into cold water, were not damaged. Tensile strengths of joints brazed with the brazing alloys of my invention were of the order of 50,000 p. s. i. in typical instances. The brazing alloys of my invention, with the important advantages of enabling the brazing operation to be carried out in air and without extraneous fluxes, can also be used for brazing ceramics to metals because they have been found to wet porcelains. They also possess utility in the application of metallized coatings by spray techniques as well as in dip processes for the coating of various steels.

The boron content of the brazing alloys of my invention will, in general, range from about 0.25% to about 2.5%, preferably about 0.5% to about 1.5%, and especially about 0.7% to about 1.2%.

The lithium content of the brazing alloys of my invention will, in general, range from about 0.25% to about 8%, preferably about 0.5% to about 4%, and especially about 1% to about 2%.

The nickel content of the brazing alloys of my invention will, in general, range from about 5% to about 50%, preferably about 10% to about 30%, and especially about 15% to about 25%.

In general, in order to incorporate 0.5% boron into the alloy there is required about 10% of nickel and this proportion in the main holds good throughout the ranges of use of boron in the brazing alloys of the present invention, namely, that the nickel content should be of the order of at least 20 times the amount of the boron.

The balance of the grazing alloys of my invention consist essentially of copper. It will be understood, of course, that minor proportions of other elements may be present or added so long as they do not unduly adversely affect the desirable self-fluxing or air-proofing brazing properties of the alloys.

The following examples are illustrative of typical self-fluxing, "air-proof" brazing alloys falling within the scope of my invention. It will be understood that others may readily be prepared in the light of the guiding principles and disclosures provided herein.

|  | Percent Cu | Percent Ni | Percent B | Percent Li |
|---|---|---|---|---|
| Example 1 | 80 | 17.75 | 0.75 | 1.5 |
| Example 2 | 62.3 | 35 | 1.2 | 1.5 |
| Example 3 | 75 | 22.7 | 0.8 | 1.5 |
| Example 4 | 63.5 | 30 | 1.5 | 5 |
| Example 5 | 55 | 40 | 2 | 3 |
| Example 6 | 75 | 22 | 1 | 2 |
| Example 7 | 88.7 | 8 | 0.3 | 3 |

A suitable method for the preparation of the grazing alloys of my invention comprises gradually dissolving small amounts of boron in molten nickel until the eutectic Ni-Ni$_2$B composition is obtained. Said eutectic is then dissolved in molten copper. Melting is conveniently carried out in recrystallized alumina crucibles in an inert atmosphere, for instance, an atmosphere of 10% hydrogen and 90% nitrogen. To the resulting alloy the requisite amount of lithium is added and the final alloy cast into porcelain or other suitable molds and allowed to solidify. It should be observed that, in melting and remelting of the alloys to obtain desired homogeneity in the alloys, a loss of lithium occurs and this should be taken into account in determining the amount of lithium desired in the final alloys. The brazing alloys of my invention can be rolled to strip form or converted to a form satisfactory for use in brazing operations.

As has been described above, the brazing operation, utilizing the brazing alloys of our invention, can be carried out in air and without the use of extraneous fluxes. This represents the particularly preferred aspect of my invention. One can, of course, conduct the brazing operation in appropriate inert atmospheres or reducing atmospheres as well as with extraneous special types of fluxes such as dry lithium chloride, although, in such cases, the full advantages of the invention are not achieved. Oxy-acetylene torch brazing techniques are quite satisfactory.

What I claim as new and desire to protect by Letters Patent of the United States is:

1. A new and improved self-fluxing, air-proof brazing alloy containing from about 0.25% to about 8% lithium, from about 0.25% to about 2.5% boron, from about 5% to about 50% nickel, and the balance consisting essentially of copper.

2. A new and improved self-fluxing, air-proof brazing alloy containing from about 0.5% to about 4% lithium, from about 0.5% to about 1.5% boron, from about 10% to about 30% nickel, and the balance consisting essentially of copper.

3. A new and improved self-fluxing, air-proof brazing alloy containing from about 1% to 2% lithium, from about 0.7% to 1.2% boron, from about 15% to about 25% nickel, and the balance consisting essentially of copper.

4. In a method of brazing metals, the step which comprises carrying out the brazing operation with a grazing alloy containing from about 0.25% to about 8.% lithium, from about 0.25% to about 2.5% boron, from about 5% to about 50% nickel, balance consisting essentially of copper.

5. In a method of brazing steels, the step which comprises carrying out the brazing operation with a brazing alloy containing from about 0.25% to about 8% lithium, from about 0.25% to about 2.5% boron, from about 5% to about 50% nickel, balance consisting essentially of copper.

6. In a method of brazing metals, the step which comprises carrying out the brazing operation with a self-fluxing, air-proof alloy containing from about 0.25% to about 8% lithium, from about 0.25% to about 2.5% boron, from about 5% to about 50% nickel, and the balance consisting essentially of copper.

7. In a method of brazing metals, the step which comprises carrying out the brazing operation with a self-fluxing, air-proof alloy containing from about 0.5% to about 4% lithium, from about 0.5% to about 1.5% boron, from about 10% to about 30% nickel, and the balance consisting essentially of copper.

8. In a method of brazing steels, the step which comprises carrying out the brazing operation with a self-fluxing, air-proof alloy containing from about 1% to about 2% lithium, from about 0.7% to about 1.2% boron, from about 15% to about 25% nickel, and the balance consisting essentially of copper.

9. In a method of brazing low carbon steels, the step which comprises carrying out the brazing operation with a self-fluxing, air-proof copper base alloy containing from about 0.5% to about 4% lithium, from about 0.5% to about 1.5% boron, and from about 10% to about 30% nickel.

No references cited.